March 28, 1967  U. L. NIX  3,311,005
TOOL HOLDER
Filed Dec. 7, 1964
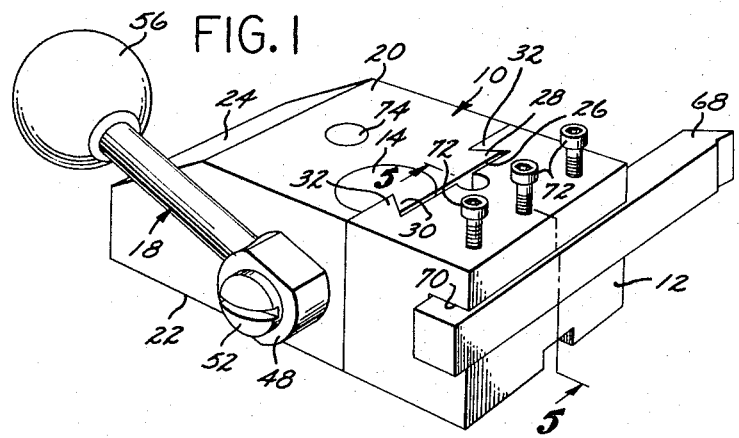
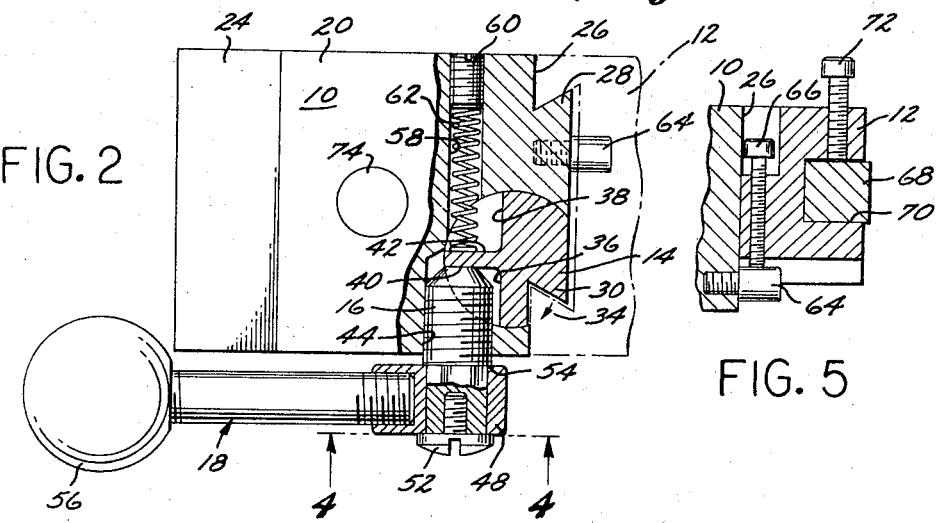
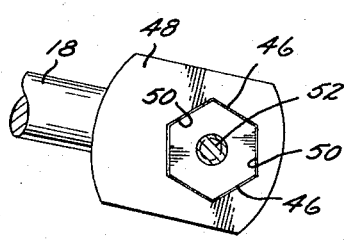
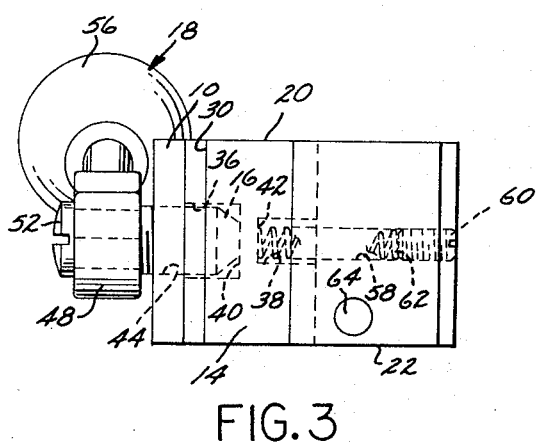
INVENTOR.
UTHAI L. NIX
BY Fulwider, Patton, Rieber,
Lee and Utecht
ATTORNEYS

United States Patent Office 3,311,005
Patented Mar. 28, 1967

3,311,005
TOOL HOLDER
Uthai L. Nix, 25014 Pennsylvania Ave.,
Lomita, Calif. 90717
Filed Dec. 7, 1964, Ser. No. 416,511
5 Claims. (Cl. 82—36)

The present invention relates to a tool holder, and more particularly to a tool holder having a base providing a slide-way for quickly detachably mounting a slide for a working element such as a tool bit or the like.

An object of the present invention is to provide a tool holder adapted to clamp working elements such as lathe tools in a manner assuring a positive lock that will not vibrate or otherwise work loose in operation.

Another object of the invention is to provide a tool holder having a base providing a slide-way adapted to mount a slide for movement along a slide axis, the tool holder including a cam defining a portion of the slide-way and adapted for rotation to engage the complemental face of the slide to thereby lock the slide in position. This arrangement permits slides of different types to be quickly interchanged upon the tool holder base and rigidly held in position during operation of the tool holder.

A further object of the invention is to provide a tool holder including a cam of the aforementioned character, and further including a clamp screw adapted for engagement and consequent rotation of the cam, the cam mounting a handle whose position relative to the cam can be changed to compensate for any wear in the tool holder parts, particularly in the cam face which engages the complemental slide face.

Yet another object of the invention is to provide a tool holder which is relatively inexpensive to manufacture, easy to maintain and operate, and characterized by reliable operation and long service life.

Other objects and features of the invention will become apparent from consideration of the following description taken in connection with the accompanying drawings, in which:

FIG. 1 is a perspective view of a tool holder according to the present invention;

FIG. 2 is a plan view of the tool holder of FIG. 1, a portion thereof being cut away to illustrate details of the rotatable cam and the means for effecting rotation thereof in opposite directions;

FIG. 3 is an end elevational view of the holder of FIG. 1, a portion thereof being cut away to illustrate the means for mounting the chip shield in position;

FIG. 4 is a detail view taken along the line 4—4 of FIG. 2; and

FIG. 5 is an enlarged detail view taken along the line 5—5 of FIG. 1.

Referring now to the drawings, there is illustrated a tool holder 10 which comprises, generally, a body or base 10 adapted to vertically slidably mount a bar or slide 12; a cam 14; a clamp screw 16 for operating the cam 14; and a handle 18 for actuating the clamp screw 16. Unless otherwise indicated, all of the components of the present tool holder are made of high grade steel characterized by high strength and good wearing qualities.

The base 10 is a generally rectangular block having parallel, horizontally disposed upper and lower faces 20 and 22, respectively. The rearward extremity of the upper face 20 slopes downwardly to provide an inclined rear face 24.

The forward end of the base 10 is provided with a vertical slide-way 26 extending along a vertical or slide axis and having a usual and conventional male dovetail configuration defined by angular projections 28 and 30. These projections interlock with a complemental pair of projections 32 which define a complemental female dovetail slide on the rearward face of the slide 12.

The projection 30 defining a portion of the slide-way 26 is constituted by a portion of the cam 14. More particularly, the cam 14 is generally cylindrical and extends vertically within a suitable bore provided in the base 10. It is rotatable in the bore about a vertical axis which is substantially parallel to the vertical or slide axis along which the slide 12 moves relative to the base 10. The projection 30 is formed on the cam 14 by a vertically extending V groove, as best viewed in FIG. 2, which is complemental with the corresponding angular faces of the projection 32 of the slide 12.

With this arrangement, the cam 14 normally acts much like a fixed part of the base 10, permitting free vertical and slidable movement of the slide 12 relative to the base 10. However, rotation of the cam 14 about its vertical axis and in a clockwise direction, as indicated by the arrow 34 in FIG. 2, urges the rearwardly and inwardly inclined face of the cam projection 30 against the corresopnding face of the adjacent projection 32 to bind and lock the slide 12 to the base 10 in an immovable relationship. Such rotation of the cam 14 within the complemental bore of the base 10 may be facilitated by proper lubrication therebetween. A positive, clockwise rotation of the cam 14 is effected by the clamp screw 16 and the handle 18, as will be seen.

The cam 14, as best viewed in FIGS. 2 and 3, includes a transverse bore 36 and a diametrically oppositely disposed transverse bore 38 having the same horizontal axis as the bore 36. The bores 36 and 38 terminate in closed inner ends which constitute a pair of oppositely facing, vertically oriented faces or flats 40 and 42. As best viewed in FIG. 2, the oppositely disposed flats 40 and 42 define a vertical web extending parallel to the slide axis of the slide 12.

The base 10 also includes a threaded transverse opening 44, FIG. 3, which forms an outward extension of the bore 36 for receiving a threaded extremity of the clamp screw 16. The opening 44 and clamp screw 16 are preferably provided with left-hand threads so that the cam 14, as will be seen, is rotated into locking engagement with the slide 12 upon movement of the handle 18 away from the slide 12.

The inner end of the clamp screw 16 engages the cam flat 40 while the outer extremity of the clamp screw 16 includes a hexagonal body characterized by six flats 46, as best viewed in FIG. 4, which are received within a complementally configured opening provided in a handle mount 48. None of the flats 50 of the opening in the handle mount 48 are parallel to the longitudinal axis of the handle 18. Instead, a pair of the oppositely disposed flats 50 are each arranged at an angle of approximately 15 degrees to the longitudinal axis of the handle 18. With this arrangement, the angular position of the handle 18 can be adjusted not only in 60-degree increments, that is, by removing it from the clamp screw 16 and rotating it forwardly or rearwardly to the next flat, but it can also be adjusted in an amount less than 60 degrees. This is done by demounting the handle 18, reversing it so that the outer face of the mount 48 is now inwardly oriented, and replacing the handle 18 on the next adjacent flat. This provides a comparatively fine adjustment of the position of the handle 18 relative to the clamp screw 16.

The inner extremity of the handle 18 is threadably secured to the mount 48, which in turn is locked in position upon the clamp screw 16 by horizontally extending retaining screw 52 threaded into a suitable opening in the outer end of the clamp screw 16. The set screw 52 bears against the outer face of the handle mount 48 and urges the inner face thereof against a circumferential shoulder 54 provided on the clamp screw 16. The outer or opposite extremity of the handle 18 mounts a spherical knob 56 to facilitate rotation of the clamp screw 16.

The bore 38 opposite the clamp screw bore 36 communicates with a transverse opening 58 provided in the base 10. The opening 58 is coaxial with the axis of the opening 38 and is threaded at its outer extremity to receive a threaded spring retention screw 60. An elongated compression spring 62 is disposed within the openings 38 and 58 and engages the screw 60 and the cam flat 42 at its opposite ends. This biases the cam 14 in a counter-clockwise direction and normally urges the cam 14 to a position permitting free slidable movement of the slide 12 when the handle 18 is in its forward or released position, that is, opposite the rearward, locking position illustrated in FIG. 1.

The presence of the clamp screw 16 in the bore adjacent the cam face 40 prevents the cam 14 from sliding upwardly or downwardly out of its bore in the base 10.

The slide 12 is prevented from sliding downwardly off the base 10 by a stop pin 64 which is threadably mounted within a suitable opening provided at the lower extremity of the slide-way 26, and projects forwardly beneath the slide 12, as best illustrated in FIG. 5. A vertical adjusting screw 66 is threadably mounted to the rearward face of the slide 12 and its lower end is in vertical alignment with and engages the stop 64. The screw 66 is urged against the stop 64 by the weight of the slide 12, and rotation of the screw 66 therefore adjusts the vertical height of the slide 12 relative to the base 10.

This permits vertical adjustment of a working element, such as a tool bit 68, relative to the workpiece (not shown). In this regard, the tool bit 68 is merely exemplary since a variety of working elements, such as drilling, turning, facing and threading equipment, can be mounted to the slide 12 or a like slide.

The tool bit 68 is carried within a transverse groove 70 provided in the forward end of the slide 12, and is locked in the groove 70 by three vertically oriented machine screws 72 which are mounted in the slide 12 and bear against the tool bit 68 at their lower extremities, as best illustrated in FIG. 5.

The base 10 is rigidly secured in position upon any relatively fixed structure, such as the lathe, milling machine or like equipment (not shown) with which it is associated. A vertically oriented anchor bolt 74 having an enlarged head is provided for this purpose and fits within a complemental opening and counterbore (not shown) provided in the base 10. The lower extremity of the anchor bolt 74 is adapted to be threaded into a suitable threaded opening (not shown) provided in the lathe or other associated equipment.

From the foregoing it will be seen that a tool holder has been provided which permits various types of slides 12 to be quickly mounted and demounted from the base 10, and which is operative to rigidly lock any such slide 12 in position upon the base 10 by merely slipping the handle 18 from a forward position to the rearward position illustrated.

Various modifications and changes may be made with regard to the foregoing detailed description without departing from the spirit of the invention or the scope of the following claims.

I claim:
1. A tool holder comprising:
a base having a slide-way adapted to mount a slide for movement along a slide axis;
a cam mounted to said base for rotation about an axis parallel to said slide axis and including a face defining a portion of said slide-way and adapted to engage the complemental face of said slide upon rotation of said cam in one direction, said cam further including a pair of oppositely disposed flats;
means carried by said base and operative against one of said flats to rotate said cam in said one direction;
and bias means carried by said base and engaged upon the other of said flats to tend to rotate said cam in a direction opposite said one direction.

2. A tool holder comprising:
a base having a slide-way adapted to mount a slide for movement along a slide axis;
a cam mounted to said base for rotation about an axis parallel to said slide axis and including a face defining a portion of said slide-way and adapted to engage the complemental face of said slide upon rotation of said cam in one direction;
a clamp screw threadably carried by said base for rotation about an axis at right angles to said slide axis, said screw being adapted to engage said cam to rotate said cam in said one direction;
and handle means secured to said clamp screw for rotation thereof.

3. A tool holder comprising:
a base having a slide-way adapted to mount a slide for movement along a slide axis;
a cam mounted to said base for rotation about an axis parallel to said slide axis and including a face defining a portion of said slide-way and adapted to engage the complemental face of said slide upon rotation of said cam in one direction, said cam further including a flat;
a clamp screw threadably carried by said base for rotation about an axis at right angles to said slide axis, said screw being adapted to engage said flat to rotate said cam in said one direction;
and handle means secured to said clamp screw for rotation thereof.

4. A tool holder comprising:
a base having a male dove-tail slide-way adapted for interengagement with a female dove-tail slide-way to thereby mount a slide for movement along a vertical axis;
a vertically elongated cam mounted to said base for rotation about a vertical axis and including a vertically elongated face defining a portion of said base slide-way and adapted to engage the complemental face of the dove-tail of said slide upon rotation of said cam in one direction, said cam further including a pair of oppositely disposed flats;
means carried by said base and operative against one of said flats to rotate said cam in said one direction;
and bias means carried by said base and engaged upon the other of said flats to tend to rotate said cam in a direction opposite said one direction.

5. A tool holder comprising:
a base having a male dove-tail slide-way adapted for interengagement with a female dove-tail slide-way to thereby mount a slide for movement along a vertical axis;

a vertically elongated cam mounted to said base for rotation about a vertical axis and including a vertically elongated face defining a portion of said base slide-way and adapted to engage the complemental face of the dove-tail of said slide upon rotation of said cam in one direction;

a clamp screw threadably carried by said base for rotation about an axis at right angles to said vertical axis, said screw being adapted to engage said cam to rotate said cam in said one direction;

and handle means secured to said clamp screw for rotation thereof.

References Cited by the Examiner

UNITED STATES PATENTS

| 1,229,802 | 6/1917 | Spade | 82—36 |
| 2,571,530 | 10/1957 | Brekke | 82—36 |
| 3,103,839 | 9/1963 | Mancuso | 82—36 |

FOREIGN PATENTS 247,275  12/1947  Switzerland.

WILLIAM W. DYER, Jr., *Primary Examiner.*

LEONIDAS VLACHOS, *Examiner.*